Patented July 14, 1931

1,814,053

UNITED STATES PATENT OFFICE

BERNHARD W. MUELLER, OF SAN FRANCISCO, CALIFORNIA, ASSIGNOR TO FIRM: PAUL LECHLER, OF STUTTGART, GERMANY

PROCESS OF PREVENTING GAS ABSORPTION IN LIQUIDS AND FOR PREVENTING RUSTING OF SUBMERGED IRON

No Drawing. Application filed July 17, 1928, Serial No. 293,497, and in Germany August 8, 1927.

It is known that certain liquids easily absorb certain gases and that oxygen, $CO_2$, $H_2S$, $SO_2$, $HCN$, $NH_3$, etc., when dissolved in water, all act, to a greater or less degree, to produce rusting and corrosion of iron or other ferrous metals submerged in water, or other liquids.

I have now demonstrated that a liquid (say water) which is covered over by means of another liquid of lighter specific gravity and insoluble therein, thereby prevents the gases from being absorbed by water, also prevents all rusting and corrosion of the metal submerged in the water, and that the protection is greater as the viscosity of the covering liquid (superposed layer) increases.

Even if a thin or light oil is placed upon the water, the access or entry of oxygen into the water is considerably checked. If this light oil is mixed with asphalt thereby making it viscous, the entry of oxygen is practically completely prevented.

In this manner, for example, iron under water can be protected from rusting (or from further rusting in case some rusting has already taken place) by maintaining a complete and continuous coating over the entire surface of the water such coating consisting of a floating layer of bitumen in solution in mineral oil.

The further rusting of iron under water is practically impossible even if water is at times added (e. g. if small amounts of rain water can enter), said added water bringing in only that amount of oxygen which it carries in solution (which is necessarily small), since the consumption of oxygen for the process of rusting is so great that the oxygen from the air contained in the added water does not suffice to produce any considerable amount of rusting. Only constant absorption of oxygen from the air renders possible rapid rusting of ferrous metal under water, and when this regular oxygen absorption is prevented, according to the present invention, by means of a superposed covering of water-insoluble liquid (preferably viscous oil) the rusting becomes slower, or if all absorption is prevented, the rusting ceases. To accomplish this, the entire surface of the water should be covered by the oily layer, continuously.

Since iron rust cannot form without the absorption of oxygen, the process of rusting, according to this new process, can be hindered or prevented even in liquids which have a strong dissolving or corroding action on iron, for example salt solutions.

A special example is the prevention of rusting of submerged iron parts of gasometers. For the prevention of rust in gas holders, all iron portions under water are to be considered; therefore not only the portions of the gas holder bell or the individual lifts remaining under water but also the inner metal surfaces of the water containers, in which the gas holder or lifts are submerged. It involves also the prevention of corrosion not especially of temporarily submerged metal but in particular the iron portions continuously under water, such as the water filled tanks, etc.

The invention is not only useful in the preventing of rusting and corrosion, but also for other useful effects.

The invention, in this specific instance, contemplates particularly the prevention of absorption of gases in liquids. The invention will be particularly described in connection with the prevention of rusting and corrosion in submerged ferrous metal, and in its more specific aspect the invention relates especially to protecting gasometers against rust and particularly the permanently submerged portions of the iron or steel parts of gasometers used for holding heating or illuminating gas and those iron or steel parts which are continuously submerged in water or other like liquids, aqueous liquids being particularly important.

Recent experiments have shown that the submerged ferrous metal parts of gasometers and other metal submerged in water, rusts or corrodes rapidly, the corrosion being produced in large part by gases dissolved in the water, such gases as oxygen, carbon dioxide, hydrogen sulphide, hydrocyanic acid and other cyanogen compounds and other acid compounds in solution in the water or taken up by the water from the atmosphere in contact with it being especially destructive to iron. As is well known, the bells of gasometers ordinarily dip into water, and the water may contain small or large amounts of salts in solution, and many of these salts also considerably accelerate the rusting of the iron. There may also be other ferrous metal parts, such as the water tank, the piping, trussing, etc., permanently submerged.

In accordance with the present invention I have found that if the water is maintained entirely free from contact with air or gases containing soluble constituents such as the substances above enumerated and others, the rusting and corrosion of the iron can easily be cut down to a very small fraction of what it would ordinarily be. In order to accomplish this result it is accordingly necessary to prevent contact of air and gases with the water forming the water seal of the gasometer. The entire surface of the body of water, including any filling well, trap, etc., are to be likewise protected.

The above result can readily be accomplished by maintaining continuously over the entire surface of the water, a layer of oil, and preferably an oil of relatively high viscosity is employed which is itself non-volatile so that the said film or layer of oil can remain for a very long time, and preferably indefinitely, upon the water of the water seal. When used on the water of a gasometer, it is necessary to maintain this layer or film of oil both upon the portion of the water area which is inside the gasometer bell, as well as the portion which is outside the gasometer bell, and if the water seal is connected with a well (for filling and so on), it is necessary that such well likewise should be free from contact with the air or the gas being stored, a layer of oil being placed thereupon.

For the accomplishment of the best results, I use an oil which has a high flash point and which is substantially non-volatile over a long period of time, and which is also not oxidizable and is not altered by air or by the gas being stored. It is also advisable to thicken the oil somewhat, or in other words to increase its viscosity, by the addition of certain bituminous materials, which of course should be added in such quantities as will not increase the specific gravity of the oil to above unity since the oil mixture must float upon the water.

Without restricting myself to particular oils or oil mixtures, I may employ the oil mixture described in the United States patent to Mezger No. 1,630,202, which, as stated in said patent may consist of 20 parts of molten petroleum pitch mixed with 80 parts of mineral oil of a high flash point. Other oil mixtures may be used. As further examples of a suitable fluid for the upper coating for the water I designate, besides a mineral oil, bitumen solution, a neutral thick oil of higher viscosity, as mixture of mineral oil and flux, mineral oil of especially high agglutinative property and petrolatum which by fusion in oil or by heating can be made fluid and mix with the oil. For a coating for hot water, I mention oil of higher vapor tension or mixtures of such neutral oils and fat with asphalt. Instead of thick oils, salve like petrolatum can also be used, which during application must be fluid or is made fluid by the heat of the liquids being covered therewith.

Other mixtures which are very suitable are the following:—

5% paraffin and 95% mineral oil of a high flash point or 10% vaseline and 90% mineral oil of a high flash point or 15% woolfat (lanolin) and 85% mineral oil of a high flash point.

The layer of oil or oil mixture on the surface of the water prevents contact of the water with the air and the gases being stored, so that the water does not take up oxygen or other water soluble gases from the air nor from the gas mixture being stored. If desired the water used for filling the water seal initially can be first boiled, subjected to a vacuum, or otherwise treated to remove the dissolved oxygen, carbon dioxide and so on, and submerged iron cannot rust neither can other metal corrode, in the absence of dissolved oxygen and so on, and this is true even if the water contains salts in solution, in substantial quantity. It is frequently advisable to employ salt solutions instead of water to prevent freezing in winter time.

By this invention it is also readily possible to prevent rusting of other submerged iron, whether parts of gasometers or not, as well as the parts of gasometers which are movable or non-movable, and which are submerged, partly or wholly, in the water of the seal.

A further example of the use of the invention is in the water containers for boiler feed water, because the water stored in these containers should be prevented from both absorbing oxygen and carbonic acid from the air. Such containers contain due to the warmth maintained, much condensed steam, (therefore chemically pure water) which has an especially great power for dissolving oxygen and absorbs it readily. Oxygen is however especially dangerous in boiler feed water because it leads to corrosion of the inner surface of the boiler and the steam conduits.

The term "iron" as used herein is intended to apply equally to steel or other ferrous metal.

If one covers for example water containing carbonic acid under normal pressure, with a layer of oil or with an oil asphalt mixture, then the carbonic acid cannot escape because it cannot penetrate the oil.

Strongly hygroscopic fluids can be protected by this process from the action of atmospheric moisture, as for example a concentrated calcium chloride solution, as is frequently used today for drying gases, by covering the solution with the described oily fluids.

The thickness of the layers of the protecting or confining fluid in the several examples, can be varied according to use. For a completely still liquid, thin layers of, for example $\frac{1}{16}$ inch thickness will suffice, and for moving fluids one may need somewhat thicker protecting layers, say up to an inch, or sometimes even more.

As illustrative of experiments showing the effect of the oil layer, I give the following (using the first oil mixture above described).

Three exactly similar pieces of iron were each similarly suspended in each of three glass cylinders, 12 cm. high and 5.5 cm. diameter (inside dimensions). One cylinder (No. III) was provided with a stop cock 2 cm. from its bottom.

Each cylinder was filled with tap water 2 cm. above the suspended iron. Upon the surface of the water in cylinders II and III was placed a layer of the mineral oil 1 cm. thick. All three cylinders were then allowed to stand at room temperature for two weeks (no oil was placed on the water in cylinder 1).

The evaporation in cylinder 1 was compensated for daily by addition of tap water to the original level.

Cylinder II was permitted to stand undisturbed during the whole experiment.

From cylinder III an amount of water was daily withdrawn, corresponding to the evaporation in cylinder 1, and then this amount was replaced by fresh tap water. This was done by means of the stop cock in the cylinder. The withdrawn water was collected.

After a short time there were great differences between I, II and III. In I there was a strong rusting of the iron with separation of a rather large quantity of iron hydroxide on the bottom and the iron was covered over with a rust coating.

In II and III the iron became dark green and a dark green sediment occurred on the bottoms. The water withdrawn from III (through the stop cock as described above) deposited iron hydroxide.

After 14 days the iron oxide on each one of the pieces of iron was washed off separately, collected and weighed, together with the precipitated iron oxide and the iron in solution. The whole corroded from the process was weighed as iron oxide and gave the following results:—

| | Cylinder I | Cylinder II | Cylinder III |
|---|---|---|---|
| Iron oxide | 0.2788 gm. | 0.0286 gm. | 0.0452 gm. |

Conclusions: Strong rusting in I. The amount of deposit in II about one-tenth of that in I. In II and III there was no "rusting" (properly speaking) but a separation of dark green intermediate product between ferrous hydroxide and ferric hydroxide. The iron oxide in III was about 1.5 times as much as in II, since in this case new (although small) quantities of carbonic acid and oxygen were daily introduced by the new additions of water.

The invention involves broadly, not only the prevention of rust and corrosion, but generally the prevention of diffusion or absorption of gases into liquids, especially the prevention of diffusion or absorption of oxygen in water, so that iron or other metals placed therein cannot rust or corrode.

It may be also noted that since there is no contact of the water with the gas in the holder, it becomes impossible for water to absorb any constituents of the gas. Even though the oil may absorb certain useful constituents of the gas, the actual quantity of the oil mixture in contact with the gas is so small that the amount so absorbed could not be great, and this small bulk of the oil remains in contact with the gas for a very long time, so that it is not a question of substitution of fresh amounts of the oil to continue to absorb such constituents, except perhaps once in several years when the whole system is cleaned up.

Practically speaking, no gas or vapor can pass into or out of the water while the latter is covered with the layer of viscous oily mixture.

I claim:

1. In the operation of water seal gasometers, the herein described improvement which comprises maintaining at all times a complete layer, at least $\frac{1}{16}$ of an inch in thickness, of a viscous mixture of a hydrocarbon oil and a bituminous material, which has a specific gravity less than unity, on the entire surface of the water, whereby oxygen and other gases are excluded from the water and corrosion is greatly retarded.

2. In the operation of water seal gasometers, the herein described improvement which comprises maintaining at all times a complete layer, at least $\frac{1}{16}$ of an inch in thickness, of a viscous hydrocarbon oil mixture, which has a specific gravity less than unity, on the entire surface of the water, whereby oxygen and other gases are excluded from the water and corrosion is greatly retarded.

In testimony whereof I affix my signature.

BERNHARD W. MUELLER.